June 2, 1970 J. H. WASILIK 3,516,027
VARIABLE SURFACE-WAVE DELAY LINE
Filed Aug. 5, 1968
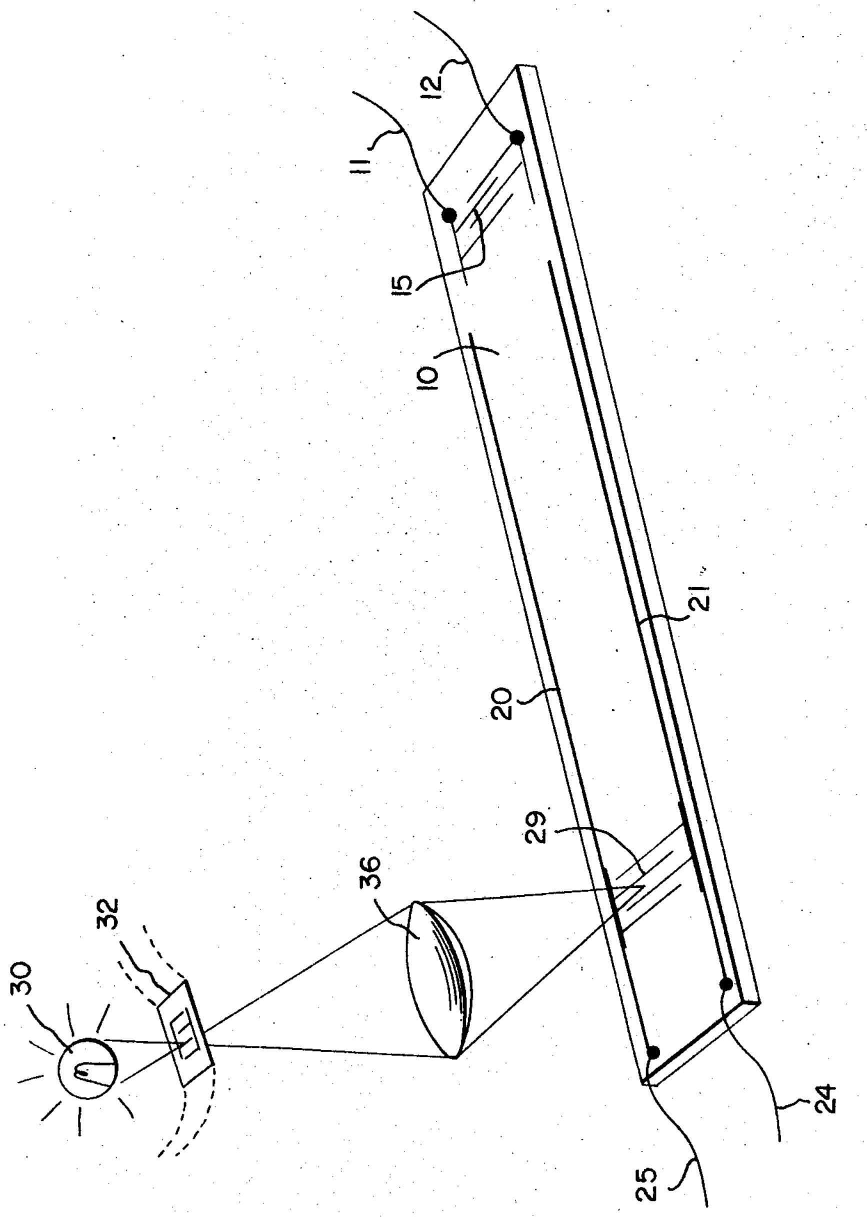
INVENTOR
JOHN H. WASILIK
BY Harry M. Saragovitz, Edward J. Kelly, Herbert Berl and J. D. Edgerton
ATTORNEYS United States Patent Office 3,516,027
Patented June 2, 1970

3,516,027
VARIABLE SURFACE-WAVE DELAY LINE

John H. Wasilik, Silver Spring, Md., assignor to the United States of America as represented by the Secretary of the Army Filed Aug. 5, 1968, Ser. No. 750,047
Int. Cl. H03h 7/36
U.S. Cl. 333—30 4 Claims

ABSTRACT OF THE DISCLOSURE

A continuously variable delay line utilizing surface wave propagation and photoconductive transducers. The surface wave originates at a driver transducer consisting of metallic electrodes deposited on a piezoelectric material. An optical image on a delay medium, which is both piezoelectric and photoconductive, generates a high conductivity pattern which functions as the electrodes of a receiving transducer. Varying the position of the optical image will vary the separation between the driver and receiver transducers and therefore vary the length of the delay.

RIGHTS OF THE GOVERNMENT

The invention described herein may be manufactured, used, and licensed by or for the United States Government for governmental purposes without the payment to me of any royalty thereon.

BACKGROUND OF THE INVENTION

The development of radar systems has emphasized the need for continuously variable delay lines operating in the L-band region. While fixed-length delay lines having low loss characteristics are available, the same is not true for continuously variable delay lines which operate in the RF or microwave region.

Previous delay line designs have utilized mechanically variable electrodes on the delay line and laser acoustic delay systems where the continuously variable delay is achieved by varying the distance from the transducer to the interception point of an acoustic signal and a laser beam. These systems are inadequate due to inherently high losses and do not operate in sufficiently high frequency ranges. They are also costly and complicated to construct.

It is therefore an object of this invention to provide a continuously variable delay line which will operate in the RF and microwave region with relatively low losses.

An additional object of this invention is to provide a continuously variable delay line which is simple and inexpensive to construct.

A further object of this invention is to provide a continuously variable delay line which can be easily modified to suit a particular application.

SUMMARY OF THE INVENTION

The foregoing and other objects of my invention are accomplished by depositing a driver transducer consisting of a metallic electrode structure on a piezoelectric delay medium. The receiver transducer is an optical image of a suitable electrode structure which is focused on the delay material. In the region of the optical image the delay material must be photoconductive as well as piezoelectric. The optical image generates a high conductivity pattern which, due to the photoconductive properties of the material, functions as a receiver transducer. Because the delay time of the line is directly proportional to the separation between the driver and the receiver transducers, varying the position of the optical image will vary the signal delay.

BRIEF DESCRIPTION OF THE DRAWING

The specific nature of the invention as well as other objects, aspects, uses and advantages thereof will clearly appear from the following description and from the accompanying drawing, in which:

The figure illustrates a continuously variable surface wave delay line in accordance with my invention.

DESCRIPTION OF THE PREFERRED EMBODIMENT

The figure shows a driver transducer 15 deposited on a delay medium 10 using state-of-the-art photomasking techniques and having the shape of a comb-type structure. The delay medium 10, which generates and propagates the surface waves from the driver transducer 15, is a piezoelectric photoconductive material such as CdS, CdSe or ZnO, or it could be a photoconductive film deposited on a piezoelectric delay medium. Leads 11 and 12 connect the driver electrode 15 to the input circuitry for the delay line. The receiver transducer 29 is a photoconductive image of an electrode pattern projected from a positive mask 32. The mask 32 has a configuration which is the same or similar to the electrode pattern of transducer 15 and an image of this mask is projected and focused on the delay medium 10 by light source 30 and lensing system 36. Metallic strips 20 and 21 are deposited on the surface of the delay medium 10 to make contact with the receiver transducer image 29 projected thereon. Leads 24 and 25 connect the receiver transducer 29 to the remainder of the system.

When the image of mask 32 is resolved and focused on the delay material 10, the optical image of receiver transducer 29 will generate a high conductivity pattern which has the equivalent function of fixed metallic transducer electrodes. The optical image of the receiver transducer 29 can be moved to any desired position along the material, thus varying the delay time of the line which is a function of the separation between the driver transducer 15 and the receiver transducer 29. The position of the image can be varied either by moving the image projecting system the delay medium whichever is more convenient under the particular circumstances involved.

Where greater flexibility is needed the metallic driver transducer electrodes 15 can be replaced by a second photoconductive transducer which is similar to the receiver transducer 29. Additionally, the masks for either of the transducers could be mounted on a conventional motion picture type transport mechanism thus providing for quick changing of the masks where instantaneous changes in the characteristics of the electrodes become necessary. With such a system a great variety of pulse shaping and signal processing techniques are available using a single delay line.

With the delay line described above it is possible to obtain delays from one-half microsecond to approximately 10 microseconds, the maximum time delay being limited only by the length of the delay medium 10. The surface waves could be propagated and transmitted equally as well on curved surfaces. A cylinder with helical guiding and contacting strips is used in such a situation and variable time delay is achieved by rotating the cylinder along with synchronized translation of the masks.

It will be apparent that the embodiments shown are only exemplary and that various modifications can be made in construction and arrangement within the scope of the invention as defined in the appended claims.

I claim as my invention:

1. A continuously variable delay line comprising:

(a) delay means to transmit a signal by surface wave propagation, said delay means comprising a piezoelectric photoconductor;

(b) a driver transducer on said delay means for generating the surface waves;

(c) a receiver transducer on said delay means, said receiver transducer being an optical image of a conventional transducer with metallic electrodes which due to the photoconductive properties of said delay medium, has electrical properties that are equivalent to a metallic transducer;

(d) a receiver transducer connecting means for connecting the receiver transducer to the delay line output.

2. The continuously variable delay line of claim 1 wherein said optical image is of the same shape as said driver transducer electrode pattern.

3. The continuously variable delay line of claim 2 wherein said receiver transducer connecting means is a pair of parallel metallic conductors deposited on the surface of said delay means so as to make contact with the optical image of said receiver transducer when said image falls at any point on the length of said receiver transducer connecting means.

4. The continuously variable delay line of claim 1 wherein said driver transducer electrodes are an optical image of conventional metallic transducer electrodes and which due to the photoconductive properties of said delay means will have similar electrical characteristics as conventional metallic electrodes.

References Cited

UNITED STATES PATENTS

| | | | |
|---|---|---|---|
| 3,185,942 | 5/1965 | White | 333—72 X |
| 3,412,269 | 11/1968 | Crittenden | 333—72 X |

HERMAN KARL SAALBACH, Primary Examiner

M. NUSSBAUM, Assistant Examiner

U.S. Cl. X.R.

250—217; 333—72